United States Patent [19]
Takemura et al.

[11] Patent Number: 5,728,776
[45] Date of Patent: Mar. 17, 1998

[54] PROCESS FOR PRODUCING GRAFT MODIFIED POLYOLEFINS

[75] Inventors: Kazuya Takemura; Kazumichi Sashi; Taichi Ogawa; Tadahiro Wakui; Shigeru Takano, all of Chiba, Japan

[73] Assignee: Kawasaki Steel Corporation, Kobe, Japan

[21] Appl. No.: 586,693

[22] PCT Filed: Jul. 29, 1994

[86] PCT No.: PCT/JP94/01250

§ 371 Date: Jan. 25, 1996

§ 102(e) Date: Jan. 25, 1996

[87] PCT Pub. No.: WO95/04091

PCT Pub. Date: Feb. 9, 1995

[30] Foreign Application Priority Data

| Jul. 29, 1993 | [JP] | Japan | 5-188486 |
| Aug. 3, 1993 | [JP] | Japan | 5-192110 |
| Mar. 31, 1994 | [JP] | Japan | 6-063563 |

[51] Int. Cl.⁶ .................. C08F 255/00; C08F 8/46
[52] U.S. Cl. .......................... 525/285; 525/265
[58] Field of Search .................. 525/285, 265

[56] References Cited

U.S. PATENT DOCUMENTS

| 2,296,218 | 10/1942 | Middleton et al. | 549/262 |
| 3,873,643 | 3/1975 | Wu | 260/878 R |
| 3,939,183 | 2/1976 | Gardner et al. | 549/262 |
| 4,616,059 | 10/1986 | Motooka | 524/487 |
| 4,762,882 | 8/1988 | Okano | 525/74 |
| 4,788,264 | 11/1988 | Ukita | 525/285 |
| 5,001,197 | 3/1991 | Hendewerk | 525/285 |
| 5,032,459 | 7/1991 | Toyoshima | 428/424.8 |
| 5,137,975 | 8/1992 | Kelusky | 525/263 |
| 5,344,886 | 9/1994 | Chang | 525/285 |
| 5,367,022 | 11/1994 | Kiang | 525/74 |

FOREIGN PATENT DOCUMENTS

| 43-18144 | 8/1943 | Japan |
| 43-27421 | 11/1943 | Japan |
| 44-15422 | 7/1969 | Japan |
| 53-61679 | 6/1978 | Japan |
| 2-8204 | 1/1990 | Japan |
| 3-11290 | 2/1991 | Japan |
| 4-114072 | 4/1992 | Japan |
| 5-97937 | 4/1993 | Japan |
| 5-279431 | 10/1993 | Japan |
| 555853 | 9/1943 | United Kingdom |
| 879549 | 10/1961 | United Kingdom |

*Primary Examiner*—Irina S. Zemel
*Attorney, Agent, or Firm*—Staas & Halsey

[57] ABSTRACT

When producing a graft modified polyolefin by melting and kneading a polyolefin, a radical-polymerizable monomer and a radical-polymerization initiator, the producing efficiency is improved. The grafting reaction is effected by feeding the melted polyolefin containing either one of said radical-polymerizable monomer and the radical-polymerization initiator to the other. When said radical-polymerizable monomer is an unsaturated carboxylic anhydride, said unsaturated carboxylic anhydride as a starting material is preliminarily heated at 50° to 250° C., and then fed to the grafting reaction mentioned above. When the monomer is an unsaturated carboxylic acid or an acid anhydride of such an unsaturated carboxylic acid, an organic peroxide of a formula (I) is used as the radical-polymerization initiator.

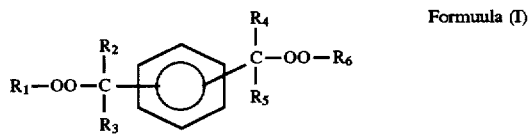

Formula (I)

In this formula (I), two substituting groups connected directly to the benzene ring have an ortho-positional relationship or a meta-positional relationship. $R_1$, $R_2$, $R_3$, $R_4$, $R_5$ and $R_6$, which are the same as or different from one another, each denote a hydrogen atom or an alkyl group having the number of carbons of 1 to 10.

20 Claims, 1 Drawing Sheet

PROCESS FOR PRODUCING GRAFT MODIFIED POLYOLEFINS

BACKGROUND OF THE INVENTION

1. Technical Field

The present invention relates to a process for producing a graft modified polyolefin having good adhesion to polar materials such as nylon, polyester, glass, metal, etc.

2. Related Art

In general, since the polyolefins have excellent mechanical properties, moldability, hygiene, etc., they have been used in wide fields. On the other hand, owing to the non-polar property, polyolefin unfavorably has poor adhesion to the polar material. In order to improve the adhesion of the polyolefin to the polar material, various proposals have been made. One of those proposals is that a radical-polymerizable monomer having polymerizable an unsaturated bond is introduced into the polyolefin by grafting the monomer with the polyolefin. As the radical-polymerizable monomer, monomers such as unsaturated carboxylic acids or their derivatives are known.

As the graft reaction process, there are a process in which the grafting reaction is effected in a solution state (for example, see Japanese patent publication No. 44-15,422), a process in which the grafting reaction is effected in a slurry state (for example, see Japanese patent publication No. 43-18,144) and a process in which the grafting reaction is effected in a molten state (for example, see Japanese patent publication No. 43-27,421).

Among these processes, according to the process (the molten state grafting process) in which an extruder is used and each of materials is melted in a melting zone of the extruder and the melts are reacted with each other in the molten state, it is easy to handle a necessary producing equipment, so that the molten state grafting process has been widely industrially used. After the grafting reaction is effected in the molten state, the grafting reaction product is subjected to a reduced pressure by means of a ventilation unit provided for the extruder so as to remove the non-reacted monomer.

However, in general, the molten state grafting reaction process unfavorably has a poor grafting efficiency.

Furthermore, the non-reacted radical-polymerizable monomer and non-grafted byproducts produced by a sub-reaction other than the grafting reaction remain in the graft modified polyolefin produced by the molten state grafting reaction. If the residual content of these byproducts increases in the grafting reaction product, the adhesion of the grafted polyolefin to the polar material is deteriorated. In addition, when a variety of members, sheets, or films are formed by molding the graft modified polyolefin, these residual byproducts may form bubbles. Therefore, it is necessary to reduce the content of these residual products.

DISCLOSURE OF THE INVENTION

It is an object of the present invention to effectively graft-polymerizing a radical-polymerizable monomer in a polyolefin-molten state in a process for the production of the graft modified polyolefin by melting and kneading the polyolefin, a radical-polymerizable monomer, and a radical-polymerization initiator.

It is another object of the present invention to largely reduce the residual content of the non-reacted monomer, the non-grafted byproduct, etc. in the process for the production of the graft modified polyolefin by melting and kneading the polyolefin, the radical-polymerizable monomer and the radical-polymerization initiator.

According to a first aspect of the present invention which is directed to a process for the production of the graft modified polyolefin by melting the polyolefin, the radical-polymerizable monomer and the radical-polymerization initiator, there is a provision of a process for the production of the graft modified polyolefin characterized in that the radical-polymerizable monomer is an unsaturated carboxylic anhydride, and this unsaturated carboxilic anhydride as a raw material is preliminarily heated at 50° to 250° C., and subjected to the grafting reaction.

Having made a trial experiment with respect to the above molten state grafting process particularly by using the unsaturated carboxylic anhydride as the monomer, the present inventors found that impurities difficult to remove under the reduced pressure remain in the modified graft modified polyolefin. The analysis of the impurities revealed that a great part of the impurities are a unsaturated carboxylic acid produced by hydrolyzing the unsaturated carboxylic anhydride and a saturated carboxylic acid produced by active radicals.

According to the first aspect, there is a provision of the process for producing the modified polyolefin by the molten state grafting reaction in which the content of the residue remaining in the modified polyolefin is consipicuously reduced by using the unsaturated carboxylic anhydride as the monomer, and in particularly, the amount of the unsaturated carboxylic acid produced by the hydrolysis and that of the saturated carboxylic acid produced by the active radicals can be reduced by so doing.

The present inventors found that the impurities present in the modified polyolefin are originated from the hydrolysate existing in the unsaturated carboxylic anhydride as the starting material fed to the grafting reacting system. This hydrolysate is the unsaturated carboxylic acid corresponding to the carboxylic anhydride. This unsaturated hydrocarbon is produced when the unsaturated carboxylic anhydride contacts with moisture contained in an atmosphere such as air before the unsaturated carboxylic anhydride is subjected to the grafting reaction. Since this unsaturated carboxylic acid has poorer grafting reactivity with the polyolefin as compared with the unsaturated carboxylic anhydride, the unsaturated carboxylic acid remains as an impurity in the modified polyolefin. In addition, since this non-reacted unsaturated carboxylic acid and the saturated carboxylic acid produced by the activated radicals have high boiling points, it was difficult to remove them from the reaction system even under the reduced pressure. Based on this knowledge, the present inventors have contrived that before the grafting reaction is effected, the unsaturated carboxylic anhydride as the starting material is heated to convert the hydrolysate to the acid anhydride and remove water by evaporation. Consequently, the inventors have reached the invention.

The unsaturated carboxylic anhydride used in this aspect is a carboxylic anhydride having a radical-polymerizable carbon-carbon double bound. As such an unsaturated carbon anhydride, one having a cyclic acid anhydride structure in its molecule is preferred. As specific chemical compound names, an unsaturated carboxylic anhydride selected from the group consisting of maleic anhydride, itaconic anhydride, citraconic anhydride and cyclopentenedicarboxylic anhydride are preferably recited. Fumaric anhydride is also preferred. Among them, maleic anhydride is particularly preferred since it is less costy and likely to be graft-reacted.

In this aspect, it is also preferable that a melt is obtained by melting either one of the unsaturated carboxylic anhydride as the starting material and the radical-polymerizable initiator together with the polyolefin and the grafting reaction is effected by feeding the other one of the unsaturated carboxylic anhydride as the starting material and the radical-polymerizable initiator as not added to the polyolefin to the melt. By so doing, the amount of the hydrolysate and the non-reacted monomer can be reduced and the grafting modification efficiency can be further enhanced.

The use amount of the unsaturated carboxylic anhydride is preferably 0.001 to 20 wt %, and particularly preferably 0.05 to 5 wt % with respect to the polyolefin in view of the adhesivility, performance as a compatible plasticizer in case of the formation of a polymer alloy with another resin, a grafting reaction efficiency, coloring prevention, long-term performance maintenance, etc. with respect to the modified polyolefin obtained.

In the first aspect, the above unsaturated carboxylic anhydride as the starting material is preliminarily heated at 50° C. to 250° C., and then subjected to the grafting reaction. The heating temperature is preferably 100° C. to 210° C., and more preferably 160° C. to 202° C. By this heating, a small amount of the hydrolysate contained in the unsaturated carboxylic anhydride as the starting material is converted to the acid anhydride and water is evaporated.

For example, as regards maleic anhydride, maleic acid as its hydrolysate is rapidly dehydrated and undergoes a cyclization reaction to be converted to maleic anhydride. By effecting this heating treatment, remaining of the maleic acid which has conspicuously low graft reactivity and is difficult to be evaporated off by the ventilating unit can be conspicuously suppressed, and the grafting reaction efficiency can be conspicuously improved.

In the first aspect, the unsaturated carboxylic anhydride is melted by heating, and the resulting melt is added to the polyolefin.

It is preferable that a liquid medium inert to the grafting modified polyolefin synthesis system in which the polyolefin, the radical-polymerizable monomer and the radical-polymerization initiator are melted and kneaded is added to the unsaturated carboxylic anhydride, the mixture is subjected to the above heating treatment, and the liquid medium containing this unsaturated carboxylic anhydride is added to the polyolefin. As this liquid medium, it is preferable to use at least one kind of an aromatic solvent selected from the group consisting of benzene, toluene, xylene, chlorobenzene, dichlorobenzene and trichlorobenzene.

When the liquid medium and the unsaturated carboxylic anhydride are mixed together and then heated, a solution of the unsaturated carboxylic anhydride may be produced. Alternatively, a slurry of the unsaturated carboxylic anhydride dispersed may be produced. In such a case, the solution is preferable.

As the polyolefin used in the first aspect, polypropylene resin, polyethylene resin (including low density products to high density products), poly-1-butene resin, poly-4-methyl-1-pentene resin, ethylene-propylene copolymer elastomer, propylene-1-butene copolymer resin or elastomer, and propylene-4-methyl-1-pentene copolymer resin or elastomer may be recited. Among them, the invention process is preferred for the production of modified products of the polypropylene resin and the polyethylene resin, and particularly preferred for the production of the modified product of the polypropylene resin.

In the first aspect, the radical-polymerization initiator may be used as the grafting reaction initiator. For example, organic peroxides such as benzoylperoxide, acetylperoxide, di-t-butylperoxide, t-butylperoxylaurate, dicumylperoxide, 1,3-bis(t-butylperoxyisoprypyl)benzene, 1-4-bis(t-butylperoxypropyl)benzene, 2,5-dimethyl-2,5-di-(t-butylperoxy)hexane, 2,5-dimethyl-2,5-di-(t-butylperoxy)hexine-3,2,5-di-(t-butylperoxy)hexane, t-butylperoxybenzoate, n-butyl-4,4-bis-(t-butylperoxy)valerate, octanoylperoxide, p-methane hydroperoxide, and t-butylperoxyacetate; azobis-compounds such as azobisisobutylnitrile, 2,2-azobis(2,4,4-trismethyvaleronitrile), and 2,2-azobis(2-cyclopropylpropionitrile); inorganic peroxides such as potassium persulfate, sodium persulfate, and ammonia persulfate may be recited.

In the first aspect, it is preferable to heat the above unsaturated carboxylic anhydride and simultaneously subject the polyolefin to the grafting reaction, from the standpoint of the productivity. Specifically, it is preferable that the polyolefin and the radical-polymerization initiator are fed through a main feeder, and the liquid is fed for the reaction by pumping through a liquid-pouring line provided in a melting zone or the like while being heated in a heating tank.

From the standpoint of appropriately maintaining the graft amount of the unsaturated carboxylic acid and the molecular weight of the modified polyolefin, the use amount of the grafting reaction initiator is 0.001 to 10 wt %, preferably about 0.05 to 2 wt % with respect to the polyolefin.

A second aspect of the present invention, there is a provision of a process for producing the graft modified polyolefin by melting and kneading the polyolefin, the radical-polymerizable monomer and the radical-polymerization initiator, which process is characterized in that the radical-polymerizable monomer is at least one kind of a radical-polymerizable monomer selected from the group consisting of unsaturated carboxylic anhydrides and unsaturated carboxylic acids, and an organic peroxide expressed by the following formula (I) is used as the above radical-polymerization initiator.

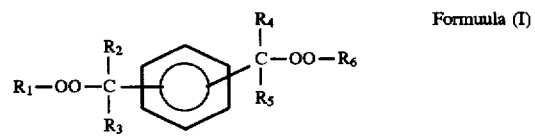

Formula (I)

In this formula (I), two substituting groups connected directly to the benzene ring have an ortho-positional relationship or a meta-positional relationship, $R_1$, $R_2$, $R_3$, $R_4$, $R_5$ and $R_6$, which are the same as or different from one another, each denote a hydrogen atom or an alkyl group having the number of carbons of 1 to 10.

In the process according to the second aspect, the graft modifying efficiency is improved and the residual monomer and the residual byproducts in the polyolefin can be reduced when the graft modified polyolefin is produced by the melting process. As a result, when the polyolefin is molded, formation of bubbles can be prevented and adhesion of the graft modified polyolefin to the polar material can be improved.

Japanese patent application Laid-open No. 53-61,679 discloses that anthracene-series compounds are co-existent during grafting reaction so as to improve the grafting efficiency. However, this publication neither discloses nor suggests that the organic peroxide having the specific structure expressed by the formula (I) is used in the molten state grafting process.

In the second aspect, the above molten state grafting reaction is effected in the presence of the radical-polymerization initiator expressed by the formula (I).

The reason why such a radical-polymerization initiator functions to improve the grafting efficiency in the above-mentioned molten state grafting reaction of the polyolefin is not clear. However, this may be considered as follows. That is, this compound produces both aromatic radicals and aliphatic radicals, which have different life spans. This may be advantageous in forming polyolefin radicals. It is considered rather disadvantageous in a peculiar molten state probably in respect of the life span that when two substituents directly bonded to the benzene ring of the above formula are located in the para-positional relationship, stability of these radicals is relatively high. When the two substituents directly bonded to the benzene ring are in the meta-positional relationship, stability of the radicals thereof is low judging from the arrangement of electrons, whereas when the two substituents are in the ortho-positional relationship, stability of radicals thereof is low due to steric hinderance between the two substituent groups.

Further, the initiator of the formula (I) in which the above-mentioned two substituents are in the meta-positional relationship is particularly preferable because it is easily available and less expensive.

Furthermore, the initiator of the formula (I) in which each of $R_1$ and $R_6$ is a tertiary alkyl group is particularly preferable because it has a high radical-producing efficiency. The initiator in which each of $R_2$, $R_3$, $R_4$ and $R_5$ is a primary alkyl group is particularly preferable from the standpoint of the steric hinderance.

Among the initiators of the formula (I), $\alpha$, $\alpha'$-bis-t-butylperoxy-m-diisopropylbenzene and $\alpha$, $\alpha'$-bis-hydroperoxy-m-diisopropylbenzene are particularly preferable, and $\alpha$, $\alpha'$-bis-t-butylperoxy-m-diisopropylbenzene is more preferable.

The radical initiators of the formula may be used singly or plurally in combination.

The use amount of the initiator of the formula (I) is ordinarily 0.001–10 wt %, preferably about 0.05–2 wt % with respect to the polyolefin from the standpoint of appropriately maintaining the grafted amount of the monomer and the molecular weight of the graft modified polyolefin.

In the second aspect, it is preferable that to the molten polyolefin containing either one of the radical-polymerizable monomer and the radical-polymerization initiator of the formula (I) is fed the other one of the radical-polymerizable monomer and the radical-polymerization initiator not added, and then the grafting reaction is effected. By so doing, the grafting modification efficiency is further improved.

In the second aspect, it is preferable that after the unsaturated carboxylic anhydride as the starting material is preliminarily heated at 50°–250° C., it is subjected to the grafting reaction. By so doing, the amount of the residue such as the hydrolysate and the saturated carboxylic acid remaining in the modified polyolefin can be further reduced, and the grafting modification efficiency can be further improved.

In the polyolefin usable in the second aspect, polypropylene resin, polyethylene resin (including low density products to high density products), poly-1-butene resin, poly-4-methyl-pentene resin, ethylene-propylene copolymer elastomer, propylene-1-butene copolymer resin or elastomer, poropylene-4-methyl-1-penten copolymer resin or elastomer, etc. may be recited. The instant process is preferred for the production of a modified polypropylene resin and a modified polyethylene resin. This process is particularly preferable for the production of the modified polypropylne resin because the melting temperature and the radical reactivity of the polypropylene resin fit the initiator of the formula (I). In such a case, it is particularly preferable to use maleic acid or maleic anhydride as the radical-polymerizable monomer because their melting temperatures fit the initiator.

The radical-polymerizable monomer used in the grafting reaction of the second aspect is at least one kind of the radical-polymerizable monomer selected from the group consisting of the unsaturated carboxylic anhydride and the unsaturated carboxylic acid. In this case, the unsaturated carboxylic acid and its acid anhydride each have a radical-polymerizable carbon-carbon double bond. These radical-polymerizable monomers may be used singly or in combination.

As the unsaturated carboxylic acid, at least one kind of an unsaturated carboxylic acid selected from the group consisting of maleic acid, fumaric acid, itaconic acid, and citraconic acid. As the unsaturated carboxylic anhydride, an unsaturated carboxylic anhydride having a cyclic acid anhydride structure in its molecule is preferred. As specific chemical compound names, an unsaturated carboxylic anhydride selected from the group consisting of maleic anhydride, itaconic anhydride, citraconic anhydride and cyclopentenedicarboxylic anhydride is preferably recited. Fumaric anhydride is also preferred. Among them, maleic anhydride is particularly preferred since it is less costy and likely to be graft-reacted.

The use amount of the radical-polymerizable monomer is preferably 0.001–20 wt %, more particularly 0.05–5 wt % with respect to the polyolefin from the standpoint of the adhesion performance of the resulting graft modified polyolefin, maintenance of the performance as a compatible plasticizer in the formation of a polymer alloy with other resin, and reduction in the residual amount of the non-reacted monomer and the byproduct.

In a third aspect of the present invention, when the graft modified polyolefin is to be produced by melting and kneading the polyolefin, the radical-polymerizable monomer and the radical-polymerization initiator, to the molten polyolefin containing either one of the radical-polymerizable monomer and the radical-polymerization initiator is added the other one of the radical-polymerizable monomer and the radical-polymerization initiator not added, and then the grafting reaction is effected.

By this process, the grafting modification efficiency of the graft modified polyolefin can be improved. Consequently, the residual amount of the impurities can be further reduced.

The reason is considered as follows. That is, these three kinds of the components are formerly melted at one time. However, if a melt is first obtained by uniformly melting the polyolefin and the radical-polymerizable monomer and the radical-polymerization initiator is added to the melt, the radical-polymerization initiator well reacts with the polyolefin so that the probability of producing radicals of the radical-polymerizable monomer. On the other hand, if a melt is first obtained by uniformly melting the polyolefin and the radical-polymerization initiator and the radical-polymerizable monomer is added to this melt, the radical-polymerization initiator also well reacts with the polyolefin from the beginning so that the probability of producing radicals of the radical-polymerizable monomer. To the contrary, the radical-polymerizable monomer conventionally often first begins to melt, and first reacts with the radical-polymerization initiator so that a considerable amount of the byproducts may seemingly be produced.

The polyolefin to be graft modified in the third aspect includes polypropylene, polyethylene (including low density products to high density products), poly-1-butene-poly-4-methyl-1-pentene, ethylene-propylene copolymer, propylene-1-butene copolymer, propylene- 4-methyl-1-pentene copolymer, ethylene-propylene-diene copolymer, etc. Among them, the third aspect is effectively applied to polypropylene and polyethylene.

As the radical-polymerizable monomer in the third aspect, unsaturated monocarboxylic acids or dicarboxylic acids such as acrylic acid, methacrylic acid, crotonic acid, isocrotonic acid, maleic acid, fumaric acid, itaconic acid, and casraconic acid as well as their anhydrides may be recited. Further, derivatives of the monomers recited above may be used. Among them, maleic anhydride is preferred since it is less costy and likely to be graft-reacted.

The use amount of the monomer is preferably 0.001–20 wt %, more particularly 0.05–5 wt % with respect to the polyolefin from the standpoint of the adhesion performance of the resulting graft modified polyolefin, performance as a compatible plasticizer in the formation of a polymer alloy with other resin, and the grafting reactivity.

As the radical-polymerization initiator usable in the third aspect, organic peroxides, azobis compounds and inorganic peroxides may be recited.

As specific examples of the organic peroxides usable in the third aspect, organic peroxides such as benzoylperoxide, acetylperoxide, di-t-butylperoxide, t-butylperoxylaurate, dicumylperoxide, $\alpha,\alpha'$-bis-t-butylperoxy-p-diisopropylbenzen, 1,3-bis(t-butylperoxyisoprypyl)benzene, 1-4-bis(t-butylperoxypropyl)benzene, 2,5-dimethyl-2,5-di-(t-butylperoxy)hexane, 2,5-dimethyl-2,5-di-(t-butylperoxy)hexine-3,2,5-di-(t-butylperoxy)hexane, t-butylperoxybenzoate, n-butyl-4,4-bis-(t-butylperoxy) valerate, octanoylperoxide, p-methane hydroperoxide, t-butylmaleic acid, t-butylperoxyacetate, etc. may be recited.

As the azobis compounds, azobisisobutylnitrile, 2,2-azobis(2,4,4-trismethylvaleronitrile), 2, 2-azobis(2-cyclopropylpropionitrile), etc. may be recited.

As the inorganic peroxides, potassium persulfate, sodium persulfate, and ammonia persulfate may be recited.

These radical-polymerization initiators may be used singly or two or more kinds of them may be used in combination.

The use amount of the radical-polymerization initiator is preferably 0.001 to 10 wt %, and particularly preferably 0.05 to 2 wt % with respect to the polyolefin in view of the adhesivility of the modified polyolefin produced, performance as a compatible plasticizer, and the reactivity.

In the second aspect, it is preferable that to the molten polyolefin containing either one of the radical-polymerizable monomer and the radical-polymerization initiator is fed the other one of the radical-polymerizable monomer and the radical-polymerization initiator not added, and then the grafting reaction is effected.

This process includes modified processes (1) and (2) mentioned below.

(1) The radical-polymerization initiator is fed to the molten and kneaded polyolefin containing the radical-polymerizable monomer.

For example, after the polyolefin and the radical-polymerizable monomer are preliminarily mixed in a non-molten state, a kneaded material is obtained by kneading the resulting mixture, and a melt is obtained by melting the kneaded material in a melting zone, and the radical-polymerization initiator is fed to the melt through a feed line provided for the melting zone.

(2) The radical-polymerizable monomer is fed to the molten and kneaded polyolefin containing the radical-polymerization initiator.

For example, after the polyolefin and the radical-polymerization initiator are preliminarily mixed in a non-molten state, a kneaded material is obtained by kneading the resulting mixture, and a melt is obtained by melting the kneaded material in the melting zone, and the radical-polymerizable monomer is fed to the melt through the feed line provided for the melting zone.

In the above modified processes, the radical-polymerizable monomer or the radical-polymerization initiator to be fed through the feed line may be in a molten or granular state.

Further, when the graft modified polyolefin is to be produced by melting the polyolefin, the radical-polymerizable monomer and the radical-polymerization initiator, it may be that the radical-polymerizable monomer is an unsaturated carboxylic anhydride, and this unsaturated carboxilic anhydride as a starting material is preliminarily heated at 50° to 250° C., and subjected to the grafting reaction; and the organic peroxide expressed by the formula (I) is used as the radical-polymerization initiator, and to the molten polyolefin containing either one of the radical-polymerizable monomer and the radical-polymerization initiator is fed the other one of the radical-polymerizable monomer and the radical-polymerization initiator, followed by the grafting reaction.

By so doing, the amount of an unsaturated carbon acid as a hydrolysate and an unsaturated carboxylic acid as a byproduct can be reduced so that the amount of a residue containing them may be further reduced to more enhance the graft modification efficiency.

In the above-mentioned aspects of the present invention, the kneader for the grafting reaction is not limited to any specific one. A single screw type extruder, a twin screw type extruder, a kneader type reactor, a Banbury mixer, a Henschel mixer, a double screw mixer, etc. may be appropriately used. Further, these kneaders may be provided with a degassing unit such as a vacuum ventilation unit for obtaining the graft modified polyolefin having a smaller amount of impurities, whereby the non-grafted byproduct and the non-reacted monomer is evaporated off.

In each of the above-mentioned aspects of the present invention, the melting/kneading temperature (the grafting reaction temperature) is selected to be such a temperature as to allow the polyolefin to fully flow, in view of the melting point and the molecular weight of the polyolefin. Ordinarily, the temperature is 120°–250° C. In the case of the polyethylene resin, the temperature is preferably 120°–200° C. In the case of the polypropylene resin, the temperature is preferably 150°–250° C. Too high temperature unfavorably causes thermal decomposition of the polyolefin and evaporation of the unsaturated carbon acid.

In each of the above-mentioned aspects of the present invention, the molten state grafting reaction time may be appropriately determined depending upon the grafting reaction temperature, the kind of the radical-polymerizable monomer, the kind of the radical-polymerization initiator, the desired grafted rate, etc. Ordinarily, the reaction time is about 0.1–10 minutes.

Further, in each of the above-mentioned aspects of the present invention, appropriate additive or additives such as antioxidant, processing stabilizer, a plasticizer, etc. may be compounded in effecting the grafting reaction so long as it does not deteriorate the advantages and the effects of the present invention.

EXAMPLES

Figure 1:
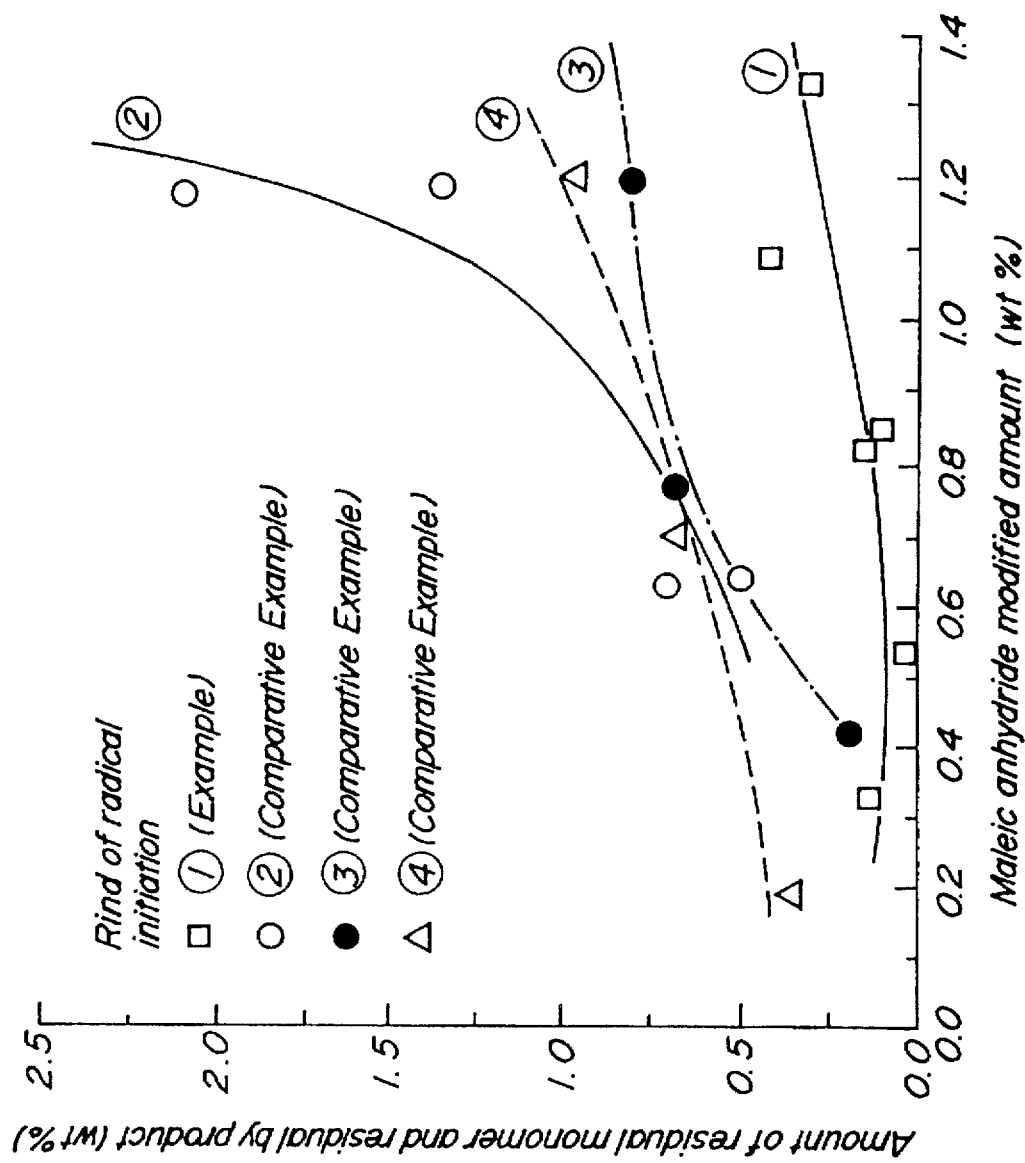
FIG. 1 is a graph showing the relationship between the modified amount of maleic anhydride and the amount of the residual monomer and the residual byproduct in the graft modified polyolefin after the modification.

In the following, examples will be described with respect to each of the aspects of the present invention. However, the present invention is not limited to these examples, but encompasses every modification of such examples. The scope of the present invention should be determined by the claims given later.

[EXPERIMENT A]

In the present examples, the grafted amount (modified amount) of maleic anhydride, the amount of the residual monomer and the residual byproduct, and the flow rate of the melt were measured by the following ways.

(1) Grafted amount (modified amount) of maleic anhydride

A sample (graft modified polyolefin) having undergone a grafting reaction was dissolved into hot xylene, and then precipitated again in acetone. The liquid acetone was filtered, and the resulting solid was dried to remove a residual monomer and a residual byproduct and purify the polyolefin. Thereafter, a film having a thickness of about 0.1 mm was formed by hot pressing, and its infrared (IR) absorption spectrum was quantitatively measured. The amount of grafted maleic anhydride was measured based on the intensity of an absorption peak (wavelength: 1785 cm$^{-1}$) attributable to the carbonyl groups in the acid anhydride structure.

(2) Amount of the residual monomer and the residual byproduct

A film, about 0.1 mm thick, was formed directly from the non-purified sample having undergone the grafting reaction by hot pressing, and its infrared absorption spectrum was measured. The amount of the maleic anhydride before the purification was quantitatively measured. The amount of the residual monomer and the residual byproduct was obtained by subtracting the grafted amount of maleic anhydride quantitatively measured in (1) from the thus measured amount.

(3) Melt flow rate (MFR)

MFR was measured at 230° C. under a load of 2160 g according to ASTM D 1238 52T.

Example A1

One hundred parts by weight of homopolypropylene (X101A, manufactured by Sumitomo Chemical Co., Ltd.) at MFR of 45 g/10 min., 5.0 parts by weight of maleic anhydride, and 0.5 parts by weight of α,α'-bis-t-butylperoxy-m-diisopropylbenzene [initiator of the formula (I)] as a radical-polymerization initiator were fully mixed by means of a Henschel mixer, and the mixture was melted and kneaded at 180° C. by using a twin screw type extruder [manufactured by Japan Steel Works, TEX30HSST type, diameter 30 mm, L/D=42. . . L: length and D: diameter]. The modified amount of the modified polypropylene obtained and the amount of the residual monomer and a residual byproduct were shown in Table 2 and FIG. 1.

Examples A2 to A6

Grafting reaction was effected in the same manner as in Example A1, and results are shown in Table 2 and FIG. 1. The compounding amount of maleic anhydride, that of the radical-polymerization initiator and the reaction temperature were as shown in Table 1.

Comparative Examples A1 to A10

Grafting reaction was effected in the same manner as in Example 1, and results are shown in Table 2 and FIG. 1. The kind of the radical-polymerization initiator, the compounding amount of maleic anhydride, that of the radical-polymerization initiator and the reaction temperature were as shown in Table 1. The kind of each radical-polymerization initiator shown in Table 1 is as given in Table 3.

As is clear from Table 2 and FIG. 1, the maleic anhydride-grafted modified polyolefins obtained in Examples have greater grafted amounts (modified amounts) of maleic anhydride as compared with those obtained in Comparative Examples even when their reaction temperature and the compounding amount of maleic anhydride were equal. In addition, it is seen that the amount of the residual monomer and the residual byproduct is remarkably low even in the high modified amount area.

TABLE 1

| | Grafting Condition | | | | | |
| --- | --- | --- | --- | --- | --- | --- |
| | | Polypropylene | | Maleic Anhydride | Radical initiator | |
| | Reaction temperature (°C.) | MFR (g/10 min) | Compounded amount (parts by weight) | Compounded amount (parts by weight) | Kind | Compounded amount (parts by weight) |
| Example A1 | 180 | 45 | 100 | 5.0 | ① | 0.50 |
| Example A2 | 193 | 45 | 100 | 5.0 | ① | 0.50 |
| Example A3 | 180 | 45 | 100 | 5.0 | ① | 0.10 |
| Example A4 | 180 | 3.5 | 100 | 2.7 | ① | 0.18 |
| Example A5 | 180 | 3.5 | 100 | 2.7 | ① | 0.18 |
| Example A6 | 180 | 3.5 | 100 | 1.0 | ① | 0.10 |
| Comparative Example A1 | 180 | 45 | 100 | 5.0 | ② | 0.50 |
| Comparative | 193 | 45 | 100 | 5.0 | ② | 0.50 |

TABLE 1-continued

| | Grafting Condition | | | | | |
|---|---|---|---|---|---|---|
| | | Polypropylene | | Maleic Anhydride | Radical initiator | |
| | Reaction temperature (°C.) | MFR (g/10 min) | Compounded amount (parts by weight) | Compounded amount (parts by weight) | Kind | Compounded amount (parts by weight) |
| Example A2 Comparative Example A3 | 170 | 45 | 100 | 5.0 | ② | 0.50 |
| Comparative Example A4 | 180 | 3.5 | 100 | 2.7 | ② | 0.18 |
| Comparative Example A5 | 180 | 45 | 100 | 5.0 | ③ | 0.50 |
| Comparative Example A6 | 193 | 45 | 100 | 5.0 | ③ | 0.50 |
| Comparative Example A7 | 180 | 45 | 100 | 2.5 | ③ | 0.25 |
| Comparative Example A8 | 170 | 45 | 100 | 5.0 | ④ | 0.50 |
| Comparative Example A9 | 180 | 45 | 100 | 5.0 | ④ | 0.50 |
| Comparative Example A10 | 203 | 45 | 100 | 5.0 | ④ | 0.50 |

TABLE 2

| | Grafted amount (wt %) of maleic anhydride | Residue monomer and residue by-product (wt %) |
|---|---|---|
| Example A1 | 1.09 | 0.43 |
| Example A2 | 1.33 | 0.31 |
| Example A3 | 0.33 | 0.13 |
| Example A4 | 0.82 | 0.14 |
| Example A5 | 0.85 | 0.10 |
| Example A6 | 0.54 | 0.03 |
| Comparative Example A1 | 1.16 | 2.10 |
| Comparative Example A2 | 1.18 | 1.36 |
| Comparative Example A3 | 0.64 | 0.50 |
| Comparative Example A4 | 0.63 | 0.71 |
| Comparative Example A5 | 0.42 | 0.19 |
| Comparative Example A6 | 1.19 | 0.82 |
| Comparative Example A7 | 0.77 | 0.69 |
| Comparative Example A8 | 0.19 | 0.37 |
| Comparative Example A9 | 0.70 | 0.69 |
| Comparative Example A10 | 1.20 | 0.99 |

α,α'-bis-t-butylperoxy-m-diisopropylbenzene

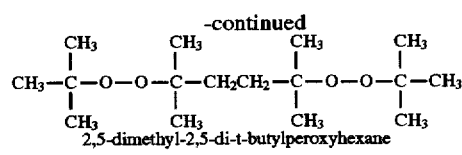

2,5-dimethyl-2,5-di-t-butylperoxyhexane

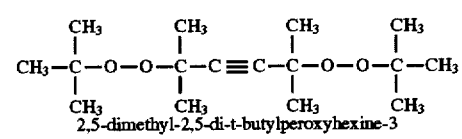

2,5-dimethyl-2,5-di-t-butylperoxyhexine-3

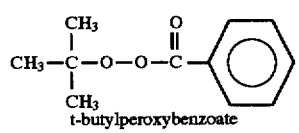

t-butylperoxybenzoate

[EXPERIMENT B]

Comparative Example B1

One hundred parts by weight of homopolypropylene (X101A, manufactured by Sumitomo Chemical Co., Ltd.) at MFR of 45 g/10 min., 5.0 parts by weight of maleic anhydride, and 0.5 parts by weight of α,α'-bis-t-butylperoxy-p-diisopropylbenzene as a radical-polymerization initiator were fully mixed by means of a Henschel mixer, and the mixture was melted and kneaded at 180° C. by using a twin screw type extruder [manufactured by Japan Steel Works, TEX30HSST type, diameter 30 mm, L/D=42]. The maleic anhydride-grafted amount (modified amount) of the modified polypropylene obtained was 0.52 wt %, and the amount of the residual monomer and a residual byproduct was 0.55 wt %. As seen, when the initiator being the para-position substituted compound of α,α'-bis-t-butylperoxy-m-diisopropylbenzene in Example 1 was used, the modified amount was reduced to half and the amount of the residual monomer and the residual byproduct was increased by about 0.1 wt % despite that the condition was utterly the same as in Example A1.

[EXPERIMENT C]

In the present experiments, the content of the acid in each modified polypropylene, the amount of the residual acid, the weight ratio (ratio of the hydrolysate to the acid anhydride) between the hydrolysate and the acid anhydride, and the flow rate of the melt were measured by the following ways.

(1) Content of acid

A film, about 0.1 mm thick, was formed directly from a non-purified modified polypropylene product having undergone the grafting reaction by hot pressing, and a infrared absorption spectrum of the film was measured. The amounts of the acid anhydride and the hydrolysate contained in the non-purified modified polypropylene were quantitatively measured based on the absorption (1785 cm$^{-1}$) attributable to the acid anhydride group and that (1710 cm$^{-1}$) attributable to the carboxylic group. These values were converted to the amount of the maleic anhydride.

Further, the non-purified modified polyolefin was dissolved into hot xylene, and then precipitated again in acetone. The liquid acetone was filtered, and the resulting solid was dried to remove the non-reacted maleic anhydride, its hydrolysate and other byproduct and purify the modified polyolefin. With respect to the thus purified modified polypropylene, the content of the acid was quantitatively measured in the same manner as mentioned above.

(2) Amount of the residual acid

The amount of the residual acid was obtained by subtracting the content of the acid in the purified modified polypropylene from the content of the acid in the non-purified modified propylene as quantitatively measured in the above (1).

(3) Weight ratio between the hydrolysate and the acid anhydride

The weight ratio between the hydrolysate group and the acid anhydride contained in the non-purified modified polypropylene and quantitatively measured in the above (1) was calculated with respect to the amount of the hydrolysate.

(4) Melt flow rate (MFR)

MFR was measured at 230° C. under a load of 2160 g according to ASTM D 1238 52T.

Example C1

One hundred parts by weight of polypropylene (X101A, manufactured by Sumitomo Chemical Co., Ltd.) at MFR of 45 was melted and kneaded at 180° C. by means of a twin screw mixer. Maleic anhydride was melted by heating at 180° C., and 20 parts by weight of the melted maleic anhydride was added to the melted polypropylene. Then, 1.4 parts by weight of $\alpha,\alpha'$-bis-t-butylperoxy-m-diisopropylbenzene [initiator of the formula (I)]as a radical-polymerization initiator was added to the resulting mixture. The content of the acid and the ratio of hydrolysate in the thus obtained non-purified modified polypropylene are shown in Table 4.

Example C2

One hundred parts by weight of polypropylene (X101A, manufactured by Sumitomo Chemical Co., Ltd.) at MFR of 45 was melted and kneaded at 180° C. by means of the twin screw mixer. Maleic anhydride was melted by heating at 150° C., and 20 parts by weight of the melted maleic anhydride was added to the melted polypropylene. Then, 1.4 parts by weight of $\alpha,\alpha'$-bis-t-butylperoxy-m-diisopropylbenzene as a radical-polymerization initiator was added to the resulting mixture. The content of the acid and the ratio of the hydrolysate in the thus obtained non-purified modified polypropylene are shown in Table 4.

Example C3

One hundred parts by weight of polypropylene (X101A, manufactured by Sumitomo Chemical Co., Ltd.) at MFR of 45 was melted and kneaded at 180° C. by means of the twin screw mixer. Maleic anhydride was melted by heating at 110° C., and 20 parts by weight of the melted maleic anhydride was added to the melted polypropylene. Then, 1.4 parts by weight of $\alpha,\alpha'$-bis-t-butylperoxy-m-diisopropylbenzene as a radical-polymerization initiator was added to the resulting mixture. The content of the acid and the ratio of the hydrolysate in the thus obtained non-purified modified polypropylene are shown in Table 4.

Comparative Example C1

One hundred parts by weight of polypropylene (SH152, manufactured by Tokuyama Soda Co., Ltd.) at MFR of 12, 5 parts by weight of powdery maleic anhydride not heated, and 0.5 parts by weight of dicumylperoxide were melted and kneaded at 180° C. by means of the twin screw mixer. The content of the acid and the ratio of the hydrolysate in the thus obtained non-purified modified polypropylene are shown in Table 4.

Comparative Example C2

One hundred parts by weight of polypropylene (SH152, manufactured by Tokuyama Soda Co., Ltd.) at MFR of 12, 5 parts by weight of powdery maleic anhydride not heated, and 0.5 parts by weight of dicumylperoxide were melted and kneaded at 170° C. by means of the twin screw mixer. The content of the acid and the ratio of the hydrolysate in the thus obtained non-purified modified polypropylene are shown in Table 4.

Example C4

Maleic anhydride was melted by heating at 100° C., thereby obtaining a melt of maleic anhydride. By using the twin screw type extruder [manufactured by Japan Steel Works, TEX30HSST type, diameter 30 mm, L/D=42], one hundred parts by weight of polypropylene (X101A, manufactured by Sumitomo Chemical Co., Ltd.) at MFR of 45 was mixed with 2.7 parts by weight of the melted maleic anhydride and 0.15 parts by weight of $\alpha,\alpha'$-bis-t-butylperoxy-m-diisopropylbenzene as the initiator, and the mixture was melted and kneaded at 180° C. The evaporation was effected by means of the ventilation unit in the twin screw type extruder. The content of the acid and the ratio of hydrolysate in the thus obtained non-purified modified polypropylene are shown in Table 5.

Example C5

The content of the acid and the ratio of hydrolysate in the thus obtained non-purified modified polypropylene are shown in Table 5.

Comparative Example C3

By using the twin screw type extruder [manufactured by Japan Steel Works, TEX30HSST type, diameter 30 mm, L/D=42], one hundred parts by weight of polypropylene (X101A, manufactured by Sumitomo Chemical Co., Ltd.) at MFR of 45, 2.7 parts by weight of the melted maleic anhydride not heated and 0.18 parts by weight of dicumylperoxide as the initiator were melted and kneaded at 180° C. The evaporation was effected by means of the ventilation unit in the twin screw type extruder. The content of the acid and the ratio of hydrolysate in the thus obtained non-purified modified polypropylene are shown in Table 5.

In Examples C1, C2, C3, C4 and C5, maleic anhydride was preliminarily melted and the above initiator of the formula (I) was used as the radical-polymerization initiator, and the content of the acid, particularly, the residual amount of the acid, is largely reduced, and the ratio of the hydrolysate is also conspicuously reduced.

TABLE 4

Results in Graft reaction in case of double-screw mixer

|  | Heated temperature of maleic anhydride (°C.) | Content of acid (wt %) | Ratio of hydrolysate |
|---|---|---|---|
| Example C1 | 180 | 2.30 | 0.09 |
| Example C2 | 150 | 1.02 | 0.20 |
| Example C3 | 110 | 0.97 | 0.29 |
| Comparative Example C1 | room temperature | 0.73 | 1.46 |
| Comparative Example C2 | room temperature | 1.17 | 1.83 |

TABLE 5

Results in graft reaction in case of double-shaft extruder

|  | Heated temperature of maleic anhydride (°C.) | Content of acid (wt %) | Amount of residual acid (wt %) | Ratio of hydrolyzate |
|---|---|---|---|---|
| Example C4 | 100 | 0.85 | 0.09 | 0.10 |
| Example C5 | 100 | 0.88 | 0.09 | 0.11 |
| Comparative Example C3 | room temperature | 0.88 | 0.50 | 0.70 |

[EXPERIMENT D]

Experiment D1

One hundred parts by weight of polypropylene (X101A, manufactured by Sumitomo Chemical Co., Ltd.) at MFR of 45, 20 parts by weight of maleic anhydride not heated and 1.4 parts by weight of α,α'-bis-t-butylperoxy-m-diisopropylbenzene as a radical-polymerization initiator were melted and kneaded at 180° C. In the obtained non-purified modified polypropylene, the content of the acid was 1.05 wt %, and the ratio of hydrolysate was 1.23 wt %.

Example D2

Maleic anhydride was melted by heating at 100° C., thereby obtaining a melt of maleic anhydride. By using the twin screw type extruder [manufactured by Japan Steel Works, TEX30HSST type, diameter 30 mm, L/D=42], one hundred parts by weight of polypropylene (X101A, manufactured by Sumitomo Chemical Co., Ltd.) at MFR of 45 was mixed with 2.7 parts by weight of the melted maleic anhydride and 0.18 parts by weight of dicumylperoxide as the initiator, and the mixture was melted and kneaded at 180° C. The evaporation was effected by means of the ventilation unit in the twin screw type extruder. In the obtained non-purified modified polypropylene, the content of the acid was 0.88 wt %, the amount of the residual acid was 0.29 wt %, and the ratio of hydrolysate was 0.13 wt %. As seen, the amount of the residual acid and the ratio of the hydrolysate in the modified polypropylene could be largely reduced by preliminarily melting maleic anhydride.

Example D3

By using the twin screw type extruder [manufactured by Japan Steel Works, TEX30HSST type, diameter 30 mm, L/D=42], one hundred parts by weight of polypropylene (X101A, manufactured by Sumitomo Chemical Co., Ltd.) at MFR of 45, 2.7 parts by weight of powdery maleic anhydride not heated and 0.18 parts by weight of α,α'-bis-t-butylperoxy-m-diisopropylbenzene as the initiator were melted and kneaded at 180° C. The evaporation was effected by means of the ventilation unit in the twin screw type extruder.

In the obtained non-purified modified polypropylene, the content of the acid was 0.89 wt %, the amount of the residual acid was 0.35 wt %, and the ratio of hydrolysate was 0.68 wt %.

Example D4

A solution of maleic anhydride was obtained by adding 2.7 parts by weight of maleic anhydride to 10 parts by weight of xylene and dissolving it under heating at 110° C. By using the twin screw type extruder [manufactured by Japan Steel Works, TEX30HSST type, diameter 30 mm, L/D=42], one hundred parts by weight of polypropylene (X101A, manufactured by Sumitomo Chemical Co., Ltd.) at MFR of 45, 12.7 parts by weight of the maleic anhydride solution and 0.18 parts by weight of dicumylperoxide as the initiator were were mixed, and melted and kneaded at 180° C. The evaporation was effected by means of the ventilation unit in the twin screw type extruder. In the obtained non-purified modified polypropylene, the content of the acid was 0.92 wt %, the amount of the residual acid was 0.31 wt %, and the ratio of hydrolysate was 0.15 wt %. As seen, even when the maleic anhydride was heated and melted in the xylene solution, the amount of the residual acid and the ratio of the hydrolysate could be largely reduced in the almost same level as in Example 6.

[EXPERIMENT E]

In Example E, the grafted amount of maleic anhydride in the modified polypropylene and the melt flow rate were measured according to the following ways.

Amount of Maleic anhydride

A grafting reaction product was dissolved in hot xylene, and succeedingly precipitated in acetone. The liquid acetone was filtered, and the resulting solid was dried to remove the non-reacted acid, a byproduct, etc. remaining in the reaction product. A film, about 0.1 mm thick, was formed from the dried and purified product by hot pressing, and an infrared absorption spectrum of the film was measured. The amount of the grafted amount of the maleic anhydride was quantitatively measured based on the absorption (1785 $cm^{-1}$) attributable to the acid anhydride group and that (1710 $cm^{-1}$) attributable to the carboxylic group. The grafted amount was wt % relative to the polypropylene.

Melt flow rate (MFR)

MFR was measured at 230° C. under a load of 2160 g according to ASTM D1238 52T.

Example E1

A twin screw type extruder [manufactured by Toshiba Kikai Kabushiki Kaisha, TEM35B type, diameter 35 mm, L/D=27] was set at a temperature of 180° C., and a mixture of 100 parts by weight of polypropylene (manufactured by Sumitomo Chemical Co., Ltd., X101A) at MFR 45 and 5 parts by weight of maleic anhydride was fed through a main feeder of the twin screw extruder at a rate of 105 parts by weight per unit time period, and melted and kneaded. On the way of melting and kneading, a radical-polymerization initiator (trade name "Percumyl D" manufactured by Nippon Fat and Oil Co., Ltd., name of material: dicumyl peroxide) was added through an auxiliary feeder provided at a melting zone at a rate of 0.5 parts by weight per unit time period. The grafted amount of the modified polypropylene obtained is shown in Table 6.

Example E2

The twin screw type extruder [manufactured by Toshiba Kikai Kabushiki Kaisha, TEM35B type, diameter 35 mm, L/D=27] was set at a temperature of 180° C., and a mixture of 100 parts by weight of polypropylene (manufactured by Sumitomo Chemical Co., Ltd., X101A) at MFR 45 and 0.5 parts by weight of the radical-polymerization initiator "Percumyl D" was fed through the main feeder of the twin screw extruder at a rate of 100.5 parts by weight per unit time period, and melted and kneaded. On the way of melting and kneading, maleic anhydride was added through thee auxiliary feeder provided at a melting zone at a rate of 5 parts by weight per unit time period. The grafted amount of the modified polypropylene obtained is shown in Table 6.

Comparative Example E1

A mixture of 100 parts by weight of polypropylene (manufactured by Sumitomo Chemical Co., Ltd., X101A) at MFR 45, 5 parts by weight of maleic anhydride and 0.5 parts by weight of the radical-polymerization initiator "Percumyl D" was fed through the main feeder of the twin screw extruder [manufactured by Toshiba Kikai Kabushiki Kaisha, TEM35B type, diameter 35 mm, L/D=27] at a rate of 105.5 parts by weight per unit time period, and the mixture of these three compounds was melted and kneaded. The grafted amount of the modified polypropylene obtained is shown in Table 6.

Comparative Example E2

Polypropylene (manufactured by Sumitomo Chemical Co., Ltd., X101A) at MFR 45 was fed through the main feeder of the twin screw type extruder [manufactured by Toshiba Kikai Kabushiki Kaisha, TEM35B type, diameter 35 mm, L/D=27], and melted and kneaded. On the way of melting and kneading, a mixture of 5 parts by weight of maleic anhydride and 0.5 parts by weight of the initiator "Percumyl D" was added through the auxiliary feeder provided at the melting zone at a rate of 5.5 parts by weight per unit time period. The grafted amount of the modified polypropylene obtained is shown in Table 6.

Example E3

One hundred parts by weight of polypropylene (manufactured by Tokuyama Soda Co., Ltd., SH-152) at MFR 15 and 5 parts by weight of maleic anhydride were fed, and melted and kneaded. After 5 minutes, 0.5 parts by weight of the initiator "Percumyl D" was added, and the reaction was further continued for 5 minutes. The grafted amount of the modified polypropylene obtained is shown in Table 6.

Comparative Example E3

One hundred parts by weight of polypropylene (manufactured by Tokuyama Soda Co., Ltd., SH-152) at MFR 15, 5 parts by weight of maleic anhydride and 0.5 parts by weight of the initiator "Percumyl D" were mixed without being melted. The mixture was fed into a twin-screw mixer where the mixture was kneaded and melted. The grafted amount of the modified polypropylene obtained is shown in Table 6.

In Table 6, "PP" denotes polypropylene, "MAH" denotes maleic anhydride, Reactor "A" denotes the above twin screw extruder, and Reactor "B" denotes the twin screw extruder.

TABLE 6

| | Reactor | Feed material at initial state | Feed material at intermediate state | Graft rate (wt %) |
|---|---|---|---|---|
| Example E1 | A | mixture of PP and MAH | Percumyl D | 0.90 |
| Example E2 | A | mixture of PP and Percumyl D | MAH | 0.83 |
| Example E3 | B | mixture of PP and MAH | Percumyl D | 0.73 |
| Comparative Example E1 | A | mixture of PP, MAH and Percumyl D | — | 0.29 |
| Comparative Example E2 | A | PP | mixture of MAH and Percumyl D | 0.62 |
| Comparative Example E3 | B | mixture of PP, MAH and Percumyl D | — | 0.40 |

As is seen from the results in Table 6, in Examples E1, E2 and E3, the grafting modification efficiency was remarkably enhanced by preliminarily melting one of maleic anhydride and Percumyl D.

[EXPERIMENT F]

Example F1

The twin screw type extruder [manufactured by Toshiba Kikai Kabushiki Kaisha, TEM35B type, diameter 35 mm, L/D=27] was set at 180° C., and a mixture of one hundred parts by weight of polypropylene (manufactured by Sumitomo Chemical Co., Ltd., X101A) at MFR of 45 and 2.7 parts by weight of maleic anhydride was fed at a rate of 102.7 parts by weight per unit time period through the main feeder of the twin screw type extruder, and melted and kneaded. On the way of melting and kneading, the radical-polymerization initiator "Percumyl D" was added at a rate of 0.18 parts by weight per unit time period through the auxiliary feeder provided at the melting zone at a rate of 5.5 parts by weight per unit time period. The grafted amount of the modified polypropylene obtained was 0.52 wt %, the amount of the residual acid was 0.42 wt %, and the ratio of the hydrolysate was 1.23 wt %.

Comparative Example F1

A mixture of 100 parts by weight of polypropylene at MFR 45, 2.7 parts by weight of maleic anhydride and 0.18 parts by weight of the radical-polymerization initiator "Percumyl D" was fed through the main feeder of the twin screw extruder [manufactured by Toshiba Kikai Kabushiki Kaisha, TEM35B type, diameter 35 mm, L/D=27] at a rate of 102.88 parts by weight per unit time period, and the mixture of these three compounds was melted and kneaded. The grafted amount of the modified polypropylene obtained was 0.23 wt %, the amount of the residual acid was 0.78 wt %, and the ratio of the hydrolysate was 1.05 wt %.

Example F2

A liquid pouring device including a heating tank and a pump was arranged almost between the main feeder and a head of the twin screw type extruder [manufactured by Toshiba Kikai Kabushiki Kaisha, TEM35B type, diameter 35 mm, L/D=27]. The twin screw type extruder was set at a temperature of 180° C., and a mixture of one hundred parts by weight of polypropylene at MFR of 45 and 0.18 parts by weight of dicumylperoxide was fed at a rate of 100.18 parts by weight per unit time period through the main feeder of the twin screw type extruder, and melted and kneaded. On the way of melting and kneading, maleic anhydride heated and melted at 100° C. was fed at a rate of 2.7 parts by weight per unit time period from the liquid pouring device provided in the melting zone. The grafted amount of the modified polypropylene obtained was 1.15 wt %, the amount of the residual acid was 0.32 wt %, and the ratio of the hydrolysate was 0.13 wt %.

Example F4

α,α'-bis-t-butylperoxy-m-diisopropylbenzen was used instead of dicumylperoxide in Example F3. The grafted amount of the modified polypropylene obtained was 1.25 wt %, the amount of the residual acid was 0.15 wt %, and the ratio of the hydrolysate was 0.15 wt %.

Among the above-mentioned Examples, Examples in which 2.7 wt % of maleic anhydride was added, the twin screw extruder was used and the reaction was effected at 180° C. in the molten state are compared with one another. When Examples A4 and C5 are compared, the ratio of the hydolysate was remarkably reduced in Example C5. When Examples D2 and C5 are compared, the amount of the residual acid was remarkably reduced in Example C5. When Examples F1 and F2 are compared, the grafting efficiency was remarkably improved in Example F2 and the amount of the residual acid as well as the ratio of the hydolysate was also remarkably reduced in Example F2. When Examples F1 and F3 are compared, the grafting efficiency was remarkably improved in Example F3 and the ratio of the hydrolysate was also remarkably reduced in Example F3. Further, in Example F4, the grafting efficiency was remarkably improved and the ratio of the hydrolysate was remarkably reduced when compared with the other Examples.

What is claimed is:

1. A process for producing a graft modified polyolefin by melting and kneading a polyolefin, a radical-polymerizable monomer and a radical-polymerization initiator, said process being characterized in that said radical-polymerizable monomer is an unsaturated carboxylic anhydride, and said unsaturated carboxylic anhydride as a starting material is preliminarily heated at 100° to 250° C. immediately prior to a grafting reaction, and then subjected immediately to said grafting reaction for producing said graft modified polyolefin.

2. The graft modified polyolefin-producing process set forth in claim 1, wherein before said unsaturated carboxylic anhydride as the starting material is subjected to said grafting reaction, a hydrolysate present in said unsaturated carboxylic anhydride is converted to an acid anhydride, and water is evaporated by said heating said unsaturated carboxylic anhydride, and then followed immediately by said grafting reaction.

3. The graft modified polyolefin-producing process set forth in claim 1, wherein a metal is obtained by melting either one of said unsaturated carboxylic anhydride as the starting material and said radical-polymerization initiator together with said polyolefin, and said grafting reaction is effected by feeding the other one of said unsaturated carboxylic anhydride as the starting material and the radical-polymerization initiator not added to the polyolefin to said melt.

4. The graft modified polyolefin-producing process set forth in claim 1, wherein said carboxylic anhydride has a cyclic acid anhydride structure.

5. The graft modified polyolefin-producing process set forth in claim 4, wherein said unsaturated carboxylic anhydride is at least one unsaturated carboxylic anhydride selected from the group consisting of maleic anhydride, itaconic anhydride, citraconic anhydride, and cyclopentene-dicarboxylic anhydride.

6. The graft modified polyolefin-producing process set forth in of claim 1, wherein said unsaturated carboxylic anhydride is heated at 100° C. to 210° C.

7. The graft modified polyolefin-producing process set forth in claim 6, wherein said unsaturated carboxylic anhydride is heated at 160° C. to 202° C.

8. The graft modified polyolefin-producing process set forth in claims 1, wherein said unsaturated carboxylic anhydride is melted by said heating treatment, and a resulting melt is added to said polyolefin.

9. The graft modified polyolefin-producing process set forth in claim 1, wherein a liquid medium inert to a graft modified polyolefin-synthesizing system in which the polyolefin, the radical-polymerizable monomer and the radical-polymerization initiator are melted and kneaded is added to said unsaturated carboxylic anhydride, said heating treatment is then effected, and said liquid medium containing said unsaturated carboxylic anhydride is added to said polyolefin.

10. The graft modified polyolefin-producing process set forth in claim 9, wherein said liquid medium is at least one aromatic solvent selected from the group consisting of benzene, toluene, xylene, chlorobenzene, dichlorobenzene and trichlorobenzene.

11. A process for producing a graft modified polyolefin by melting and kneading a polyolefin, a radical-polymerizable monomer and a radical-polymerization initiator, said process being characterized in that said radical-polymerizable monomer is at least one kind of a radical-polymerizable monomer selected from the group consisting of an unsaturated carboxylic acid and an acid anhydride of said unsaturated carboxylic acid, and an organic peroxide expressed by the following formula (I) is used as said radical-polymerization initiator:

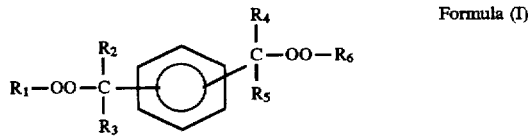

Formula (I)

in which two substituting groups connected directly to the benzene ring have an ortho-positional relationship or a meta-positional relationship, wherein, $R_1$, $R_2$, $R_3$, $R_4$, $R_5$ and $R_6$, which are the same as or different from one another, each denote a hydrogen atom or an alkyl group having from 1 to 10 carbon atoms; and wherein said radical-polymerizable monomer is an unsaturated carboxylic anhydride, and said unsaturated carboxylic anhydride as a starting material is preliminarily heated at 100° to 250° C. immediately prior to a grafting reaction, and then subjected immediately to said grafting reaction for producing said graft modified polyolefin.

12. The graft modified polyolefin-producing process set forth in claim 11, wherein a metal is obtained by melting either one of said radical-polymerizable monomer and said radical-polymerization initiator together with said polyolefin, and said grafting reaction is effected by feeding the other one of said radical-polymerizable monomer and said radical-polymerization initiator not added to said polyolefin to said melt.

13. The graft modified polyolefin-producing process set forth in claim 11, wherein said two substituents directly bonded to said benzene ring in said radical-polymerization initiator is in a meta-positional relationship.

14. The graft modified polyolefin-producing process set forth in claim 13, wherein each of said $R_1$ and $R_6$ is a tertiary alkyl group, and each of said $R_2$, $R_3$, $R_4$ and $R_5$ is a primary alkyl group.

15. The graft modified polyolefin-producing process set forth in claim 14, wherein said radical-polymerization initiator is α,α'-bis-t-butylperoxy-m-diisopropylbenzene.

16. The graft modified polyolefin-producing process set forth claim 11, wherein said radical-polymerizable monomer is at least one kind of a radical-polymerizable monomer selected from the group consisting of maleic acid, fumaric acid, itaconic acid, citraconic acid, maleic anhydride, itaconic anhydride, and citraconic anhydride.

17. The graft modified polyolefin-producing process set forth in claim 16, wherein said radical-polymerizable monomer is at least one kind of a radical-polymerizable monomer selected from the group consisting of maleic acid and maleic anhydride.

18. The graft modified polyolefin-producing process set forth claim 14, wherein said polyolefin is a polypropylene.

19. A process for producing a graft modified polyolefin by melting and kneading a polyolefin, a radical-polymerizable monomer and a radical-polymerization initiator, said process being characterized in that said radical-polymerizable monomer is an unsaturated carboxylic anhydride, said unsaturated carboxylic anhydride as a starting material is preliminarily heated at 100° to 250° C. immediately prior to a grafting reaction, and then subjected immediately to said grafting reaction for producing said graft modified polyolefin, and an organic peroxide expressed by the following formula (I) is used as said radical-polymerization initiator, and a melt is obtained by melting either one of said radical-polymerizable monomer and the radical-polymerization initiator together with said polyolefin, and said grafting reaction is effected by feeding the other one of said radical-polymerizable monomer and said radical-polymerization initiator not added to the polyolefin to said melt:

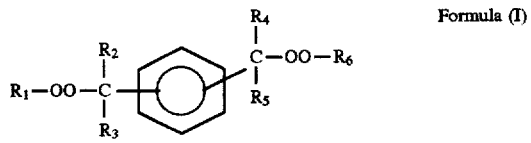

Formula (I)

in which two substituting groups connected directly to the benzene ring have an ortho-positional relationship or a meta-positional relationship, wherein $R_1$, $R_2$, $R_3$, $R_4$, $R_5$ and $R_6$, which are the same as or different from one another, each denote a hydrogen atom or an alkyl group having from 1 to 10 carbon atoms.

20. The graft modified polyolefin-producing process set forth in claim 19, wherein a kneaded mixture is obtained by kneading said polyolefin and said radical-polymerizable monomer in a non-molten state, a melt is obtained by melting the resulting kneaded mixture in a melting zone, and said radical-polymerization initiator is fed to said melt through a feed line provided for the melting zone.

* * * * *

UNITED STATES PATENT AND TRADEMARK OFFICE
CERTIFICATE OF CORRECTION

PATENT NO. : 5,728,776
DATED : March 17, 1998
INVENTOR(S) : Takemura et al.

It is certified that error appears in the above-identified patent and that said Letters Patent is hereby corrected as shown below:

Title Page, [30], change "6-063563" to -- 6-63563 --.

Col. 20, line 8, delete "of";

line 13, change "claims" to --claim--.

Signed and Sealed this

Eleventh Day of August 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,728,776

DATED : March 17, 1998

INVENTOR(S) : Takemura et al.

It is certified that error appears in the above-identified patent and that said Letters Patent is hereby corrected as shown below:

Col. 19, line 57, "a metal" should be --a melt--.

Signed and Sealed this

Twenty-ninth Day of September, 1998

Attest:

BRUCE LEHMAN

Attesting Officer

Commissioner of Patents and Trademarks